(No Model.)
E. WESTON.
ELECTRICAL MEASURING INSTRUMENT.
No. 533,107.  Patented Jan. 29, 1895.
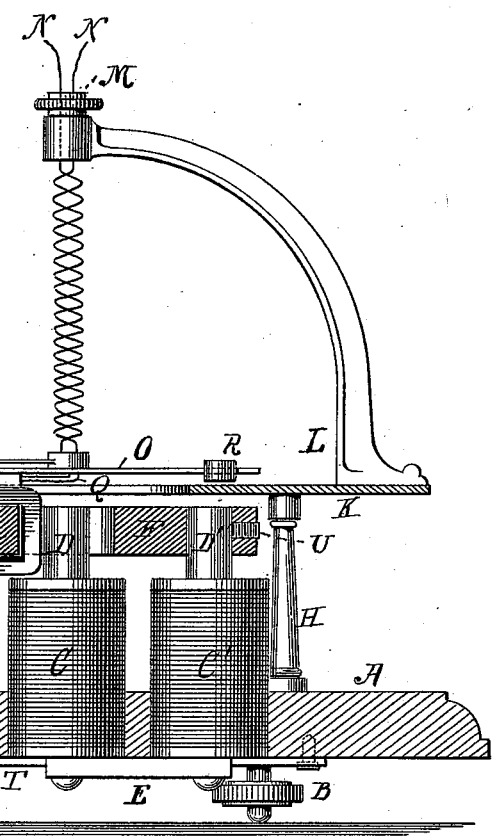
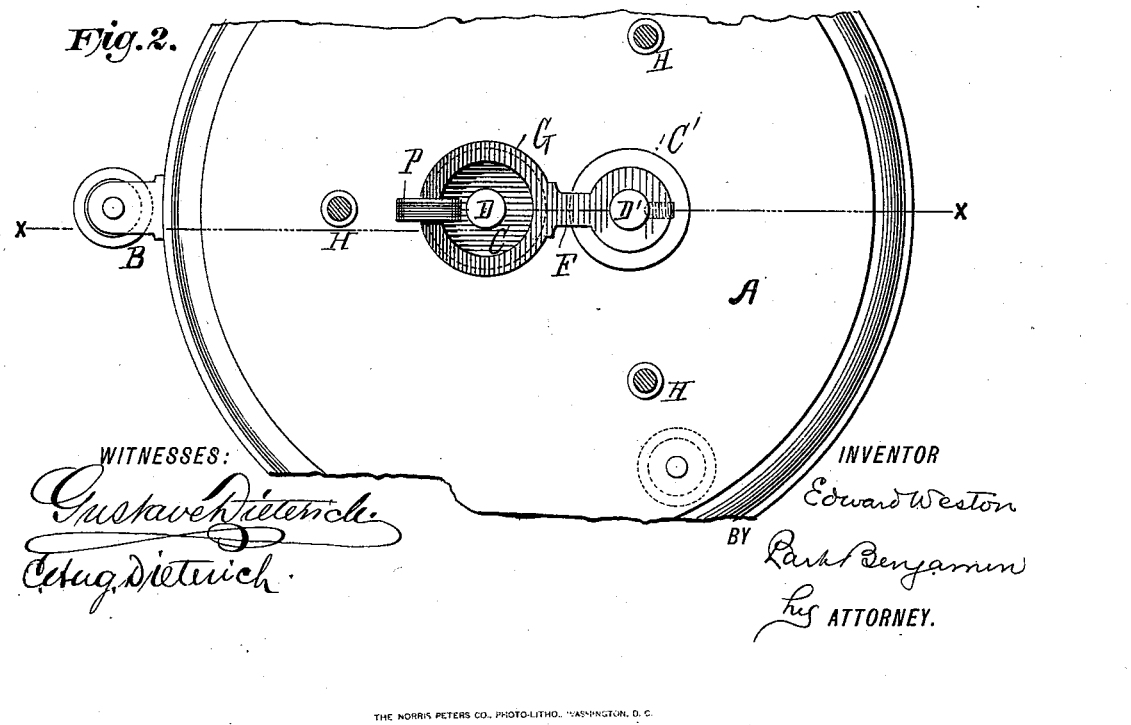
WITNESSES:
Gustave Dieterich
Aug. Dieterich
INVENTOR
Edward Weston
BY Park Benjamin
his ATTORNEY.

United States Patent Office.

EDWARD WESTON, OF NEWARK, NEW JERSEY.

ELECTRICAL MEASURING-INSTRUMENT.

SPECIFICATION forming part of Letters Patent No. 533,107, dated January 29, 1895.

Application filed March 11, 1891. Serial No. 384,650. (No model.)

*To all whom it may concern:*

Be it known that I, EDWARD WESTON, of Newark, Essex county, New Jersey, have invented a new and useful Improvement in Electrical Measuring-Instruments, of which the following is a specification.

My invention is an instrument designed for measuring the difference in potential in a current between its terminals and which hence may be employed for the determination of either current strength or current pressure.

My invention consists more particularly in the construction of the said instrument, which embodies a magnet having its poles disposed so that there is an annular field between them, and a coil supported so as to be bodily movable around and extending through said annular field.

In the accompanying drawings, Figure 1 is a side elevation and partial sectional view of the instrument. Fig. 2 is a plan or top view.

The apparatus is mounted on the usual base A, which is supported by leveling screws B. In the base A are set two electro magnets, C, C', the cores, D, D', of which are connected by the bridge piece E. To the projecting end of core D' is secured an iron plate F formed with a ring G at its end, which ring surrounds the end of core D. A space is left between the ring and core, as shown in Fig. 2.

K is a metal plate supported by standards H which rise from the base A. This plate is annular in form, and carries the arm L. The arm L terminates in a tube in which is inserted a plug of insulating material M. Through the plug extend two wires N, N of resilient material, such as hard brass, which below the plug M are formed into spirals wound in the same direction, as shown. The spirals support a light bar or plate O of insulating material; or in case the bar O is made of metal, the wires N are insulated from it. Bar O carries at one end a light frame P, upon which is wound a coil of insulated wire, the terminals of said coil connecting at Q with the ends of the wires N, N. The frame P is of proper shape to fit over the ring G, for which purpose it may be made in sections, or the plate F may be made into two parts bolted together; or any other convenient means for the purpose may be adopted. At the opposite end of the bar O to that which carries the frame P, is applied an adjustable counterweight R, which serves to counter-balance the arm P and its coil. The wires N, N after passing through the plug M, constitute the terminals of the instrument and receive the current to be measured. The bar O also carries the needle S which sweeps over a scale suitably marked on the plate K.

The operation of the instrument is as follows: It will be obvious that in the annular space between the ring G and the pole D, there exists a very intense field of force which is traversed by a portion of the coil on frame P. When this coil is traversed by a current it has a tendency, in accordance with well-known laws, to move around the center of the ring or core D to an extent depending upon the difference of potential between the terminals of the instrument. The coil in moving around the ring G carries with it the needle S, which thus shows the extent of movement of the coil upon the scale on the plate K, which may be suitably marked in units of electrical strength or pressure. It will be observed that I have here taken advantage of a principle of construction by which the coil is caused to move in a practically uniform field—that is, the attractive or motive power of the magnetic force is the same in effect upon the coil whatever may be its position within the field of force. The resiliency of the spirals N tends to return the needle to its normal position when the current is interrupted. The electro-magnets C, C' rest upon a plate T, which is secured to the under side of the base A, and by this means are held in place. The plate F is secured to the pole P' by the set-screw U.

The current which passes through the wires N N may also pass through the electro-magnets C C', or said electro-magnets may be energized from a separate source of electricity, or for them may be substituted a permanent magnet.

I claim—

1. In an electrical measuring instrument, a magnet having its poles disposed so that there is an annular field between them, a coil extending through and supported so as to be bodily movable around said field, and means for indicating the extent of movement of said coil in opposition to a specific tension when an electrical current is passed through the coil.

2. In an electrical measuring instrument, in combination with a scale an index and a magnet having a pole D and a ring pole G surrounding the said pole D, a coil P inclosing and movable along said pole G and actuating said index needle over the scale in opposition to a specific tension when an electrical current is passed through the coil.

3. In an electrical measuring instrument, in combination with a magnet having one pole annular in form and surrounding the other pole, a support rotary about a center in a horizontal plane and a coil eccentrically disposed thereon inclosing said annular pole and extending through the annular field between said poles, and a means of counterbalancing the weight of said coil upon said support.

4. In an electrical measuring instrument in combination with a magnet having one pole annular in form and surrounding the other pole, a support rotary about a center in a horizontal plane and carrying a coil eccentrically disposed thereon and an index; the said coil inclosing said annular field between said poles and moving against tension when an electrical current is passed through the coil.

5. In an electrical measuring instrument, the combination of the electro-magnets C C' having coils D D' and ring pole piece F secured to or formed on one of said cores and surrounding the other core, the coil P surrounding the ring pole F, the bar O supporting said coil, and a suspension device carrying said bar O, and an index needle S with means for passing an electrical current through the coil and for returning the latter to starting point after the defective impulse has ceased, substantially as described.

EDWARD WESTON.

Witnesses:
R. C. FESSENDEN,
A. F. CONERY, Jr.